United States Patent [19]

Barakat

[11] Patent Number: 5,006,698

[45] Date of Patent: Apr. 9, 1991

[54] ANTIFRAUD METHOD AND DEVICE FOR A SELECTIVE ACCESS SYSTEM

[75] Inventor: Simon Barakat, Andresy, France

[73] Assignee: Schlumberger Industries, Paris, France

[21] Appl. No.: 215,959

[22] Filed: Jul. 7, 1988

[30] Foreign Application Priority Data

Jul. 7, 1987 [FR] France ................................ 87 09604

[51] Int. Cl.[5] ........................... G06K 7/00; G07G 1/14

[52] U.S. Cl. ..................................... 235/382; 235/379; 235/492; 902/4; 902/5; 902/8

[58] Field of Search ................. 235/382, 379, 80, 381, 235/487, 92; 340/825.31, 825.32, 825.34; 902/4, 5, 8

[56] References Cited

U.S. PATENT DOCUMENTS

| | | | |
|---|---|---|---|
| 3,731,076 | 5/1973 | Nagata et al. . | |
| 4,439,670 | 3/1984 | Basset et al. | 235/382 |
| 4,449,040 | 5/1984 | Matsuoka et al. | 235/380 |
| 4,484,067 | 11/1984 | Obrecht | 235/382 X |
| 4,578,567 | 3/1986 | Granzow et al. | 235/382 X |
| 4,629,871 | 12/1986 | Scribner et al. | 235/382 X |
| 4,684,791 | 8/1987 | Bito | 235/382 X |
| 4,798,941 | 1/1989 | Watanabe | 235/380 |
| 4,801,787 | 1/1989 | Suzuki | 235/382 X |

FOREIGN PATENT DOCUMENTS 160833 11/1985 European Pat. Off. .

*Primary Examiner*—Stuart S. Levy
*Assistant Examiner*—Steven M. duBois
*Attorney, Agent, or Firm*—Frishauf, Holtz, Goodman & Woodward

[57] ABSTRACT

A method and apparatus for protecting a selective access system against fraudulent use of a magnetic card having a confidential card. Each cade (CM) is associated with a class corresponding to a zone of a memory (PROM). The number of classes is equal to the number of zones and is substantially less than the number of cards (CM) which may be presented. At each failure to input a confidential code, one of the bits is modified in the corresponding memory zone.

11 Claims, 2 Drawing Sheets

ANTIFRAUD METHOD AND DEVICE FOR A SELECTIVE ACCESS SYSTEM

The present invention relates to a method and a device for preventing fraudulent use of dishonestly-obtained access means in a selective access system, by effectively detecting systematic search operations for the confidential codes attributed to such access means.

In one of its possible applications, the invention seeks, for example, to prevent the dishonest use of stolen magnetic memory credit cards in conjunction with point-of-sale terminals. Such cards having magnetic memory are referred to below as "magnetic" cards, even though they are usually made mostly of non-magnetic plastic.

BACKGROUND OF THE INVENTION

In conventional manner, the method of the invention includes the following stages: on each occasion that an access means is presented to the system, the validity of a confidential code indicated by the user of said means, said verification being interpreted as a success if the code is valid and as a failure otherwise; keeping a trace, in memory, of the failures observed on successive occasions that access means are presented; and emitting a signal representative of a dishonest attempt when the number of failures exceeds a predetermined limit.

The invention is applicable to all cases where each access means comprise or contain data (which is generally public) enabling a relationship (which is kept secret) to be used to verify the validity of the confidential code which the user of the access means provides in an independent manner, for example via a keyboard.

In one of its implementations, it is even effective when there exists a priori a possibility of fraud based on a systematic search for the confidential numbers of several access means simultaneously.

Access means can be used dishonestly, for example with stolen magnetic credit cards, which are used in conjunction with a point-of-sale terminal including a keyboard via which customers desiring to pay with a magnetic credit card should normally indicate their confidential code.

Insofar as the result of the card user indicating an invalid confidential code gives rise to a refusal to accept payment, any person having access to such a cash register and in possession of a stolen magnetic card is, a priori, in a position to perform successive tests to search for the confidential code attributed to the card, and then to use the confidential code in order to debit a bank account belonging to someone else.

There are normally four digits in a confidential code, so a systematic search necessarily give rise to success after a number of tests not exceeding 10,000.

The conventional solution for preventing this fraud consists in maintaining a list in the memory of the point-of-sale terminal of the numbers or identification codes of the magnetic cards most recently used therewith, and for which the customer gave the wrong confidential code.

Security is obtained by imposing a limit on the number of times the same number may appear in the list, i.e., by imposing a maximum number of failures allowed for the same magnetic card.

If this number is exceeded, the card in question is cancelled.

The main drawback of this prior technique is that the memory containing the list of card numbers operates like a shift register. Once the list is full, any subsequent failure eliminates the oldest failure card number from the memory, such that all trace of said failure disappears.

The security arrangements can thus be circumvented by searching for the confidential codes of several magnetic cards at once, and using the cards one after another such that the ratio of the maximum number of numbers that can be stored in the list divided by the number of cards being tested remains less than the failure limit beyond which a card is cancelled.

In this context, the object of the present invention is to provide a security method and device which avoids the defects of the above-defined technique by being particularly economical with memory space.

SUMMARY OF THE INVENTION

To this end, the method of the invention includes the improvement whereby the operation consisting in keeping a trace of failures itself comprises the following operations: defining a plurality of memory zones in the memory; assigning a class to each access means presented, said class being taken from a set of classes each of which corresponds to a memory zone; and storing in each memory zone a count of the number of failures relating to those of the presented access means which belong to the class corresponding to said memory zone, with the operation of emitting a signal indicative of an attempted fraud being controlled by the number of failures recorded in any of the memory zones exceeding a limit number assigned to said zone and constituting said predetermined limit.

When the method of the invention is applied to magnetic cards, such as credit cards, each of which has at least one intrinsic attribute belonging thereto, e.g., a confidential code or an identification number, the class number assigned to each magnetic card is preferably deduced from the intrinsic attribute of said card by applying a predetermined many-to-one function to said intrinsic attribute. Such a function is known, in the computer art, as a "hashing" function. It is essential that each card gives rise to a specific memory zone, and it is desirable for most memory zones to correspond to a reasonable number of cards.

For example, the number of the class assigned to each magnetic card is given by a set of one or more digits taken from the identification of said card, with said digit(s) being taken as a function of the position occupied in said number, and with said position(s) being predetermined and being selected to be closer to the least significant end of the identification number than to the more significant end of said number such that all of the possible values from 0 to 9 of each extracted digit are substantially equiprobable over the set of cards presented, with said limit number then being the same for all of the memory zones.

In a simple implementation of the invention, the correspondence between each class and a memory zone is such that the number of each class defines the address of the memory zone to which it corresponds.

To avoid frauds making use of a large number of magnetic cards, the method of the invention may include a second operation of emitting a signal representative of an attempt at fraud when the number of failures recorded in all of the memory zones of the memory taken as a whole exceeds a second predetermined limit.

The invention also provides a device, which in conventional manner comprises: data input means suitable for receiving at least a portion of an intrinsic attribute of an access means, said attribute being related to the precise confidential code of the access means, and also for receiving a confidential code as indicated by the user of the access means; processor means connected to the input means and suitable for verifying the validity of the confidential code indicated by the user; and a memory connected to the processor means in which the processor means records failure data each time a confidential code turns out to be invalid.

According to the invention, the device includes the improvement whereby said memory is split into zones which are accessible at different addresses, and the processor means is designed to generate a memory address as a function of at least said attribute of the access means and to record the failure data in the memory zone corresponding to said address.

Advantageously, the memory comprises a programmable read only memory in which each failure data item is recorded in the form of a single bit.

In a preferred implementation of the invention, the memory is constituted by the PROM of a "smart" or semiconductor memory card, while the processor means comprise the microprocessor of said card.

BRIEF DESCRIPTION OF THE DRAWINGS

An implementation of the invention is described by way of example with reference to the accompanying drawings, in which.

DESCRIPTION OF PREFERRED EMBODIMENT

The invention provides a method and a device for preventing fraudulent use of a dishonestly-obtained access means in association with a selective access system.

The term "selective access system" is used herein to designate any system capable of giving each of its potential users a certain privilege, such as access to a service or delivery of a product, providing said user presents a valid access means to the system and its validity is confirmed by the user also providing a valid confidential code.

There are numerous examples of selective access systems.

A computer system controlling a data base to which users may have access only after indicating both their name or user code and also the exact confidential code which has been attributed to them, constitutes one such selective access system. A point-of-sale terminal or cash register provided with a magnetic credit card reader and a keyboard enabling a card holder to indicate the confidential code, and which accepts payment by card only after verifying the validity of the confidential code, constitutes another selective access system.

In the first example, a user's access means is immaterial in nature: it is constituted, for example, by a string of letters; in the second example the user's access means is material in nature: it is a magnetic card. Nevertheless, these two cases are similar in that in both of them the access means are personalized relative to the user by intrinsic attributes which are generally not confidential in nature, i.e., the name of the user in the first example and the identification code or number of the user's magnetic card in the second example. Similarly, in both of these examples, access is obtained to the system only after the user has indicated a confidential code assigned to the user, and the validity of the code has been verified by the system. Such verification is performed, for example, by comparing a function of the confidential code (which function is itself kept secret) with the intrinsic attribute of the access means.

If the comparison gives rise to non-equality, this result gives rise to access to the system being denied, whereas access to the system is given in the event of the comparison finding an equality.

Figure 1:
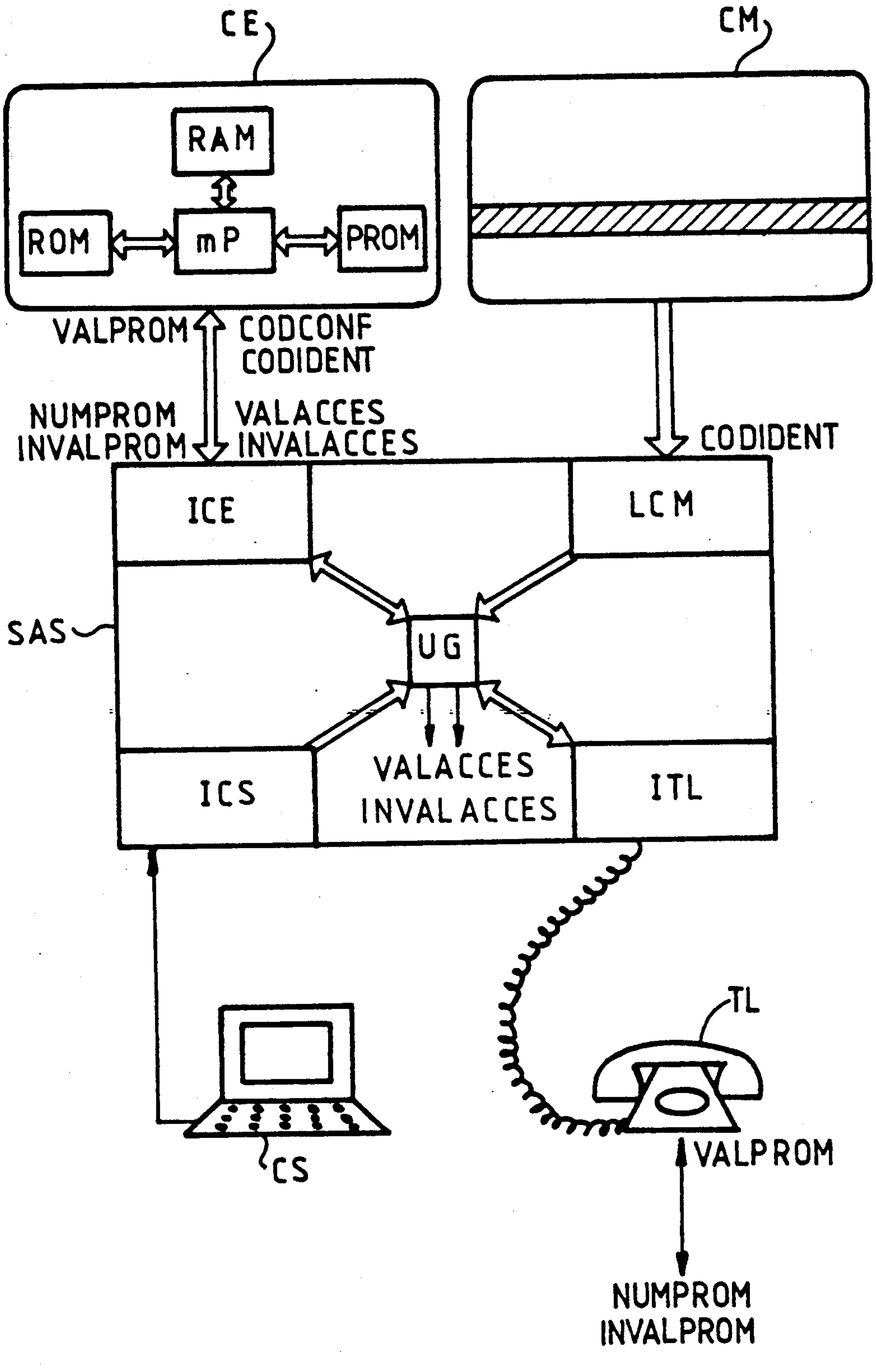
FIG. 1 shows a portion of the functional architecture of a selective access point-of-sale terminal in which the improvement of the invention has been integrated.

Thus, although the selective access system (SAS) shown in FIG. 1 is a diagrammatic representation of a point-of-sale terminal, it will be clear to the person skilled in the art that the invention is equally applicable to any other selective access system, and in particular a computer system controlling a data base.

In conventional manner, a point-of-sale terminal SAS comprises a control unit UG connected to a plurality of peripheral members including a magnetic card reader LCM, a console interface circuit ICS, and a telephone interface circuit ITL.

The reader LCM is used to read an attribute from each magnetic card CM, e.g., the identification code or number CODIDENT of the card.

The interface ICS connected to the console CS is suitable for receiving the confidential code CODCONF keyed in the user of the card CM.

In accordance with the invention, the point-of-sale terminal SAS is also provided with an interface circuit for an electronic card ICE for two-way data exchange between the control unit UG and a microprocessor electronic card CE. Interface circuits such as ICE, and electronic cards such as CE are well known to the person skilled in the art and detailed description thereof is therefore superfluous. In order to understand the present invention, it suffices to recall that "smart" cards, i.e., electronic memory cards CE having a microprocessor, include a microprocessor mP which is generally connected to a non-programmable read only memory ROM, to a programmable read only memory PROM, and to a working or random access memory RAM. The card CE is conventionally provided with means (not shown) enabling the microprocessor mP not only to read, but also to write data in the programmable read only memory PROM. Electronic memory cards are referred to below, for short, merely as "electronic" cards, thereby distinguishing them from "magnetic" cards.

Naturally, the writing of data into the PROM is irreversible, such that the PROM appears as a consumable memory for writing purposes. As a result the PROM is non-volatile. In addition, electronic cards CE are also provided in conventional manner with means for preventing access from outside the card to the data stored in the PROM. So far as implementing the invention is concerned, it is these properties which are desirable rather than specifically making use of an electronic card.

The trader possessing the point-of-sale terminal SAS inserts an electronic card CE into the circuit ICE in order to enable the point-of-sale terminal to operate.

In addition, the trader must ask the organization responsible for distributing and controlling electronic cards CE to send a signal VALPROM over the telephone network via the telephone TL and the circuits ITL, UG, and ICE in order to validate the use of a new electronic card CE or to revalidate an electronic card which has been invalidated by the total number of failures recorded in said card exceeding a predetermined quota, as described with reference to the last operation of the FIG. 2 flow chart.

The signal VALPROM is stored, for example, in the PROM of the electronic card CE.

Figure 2:
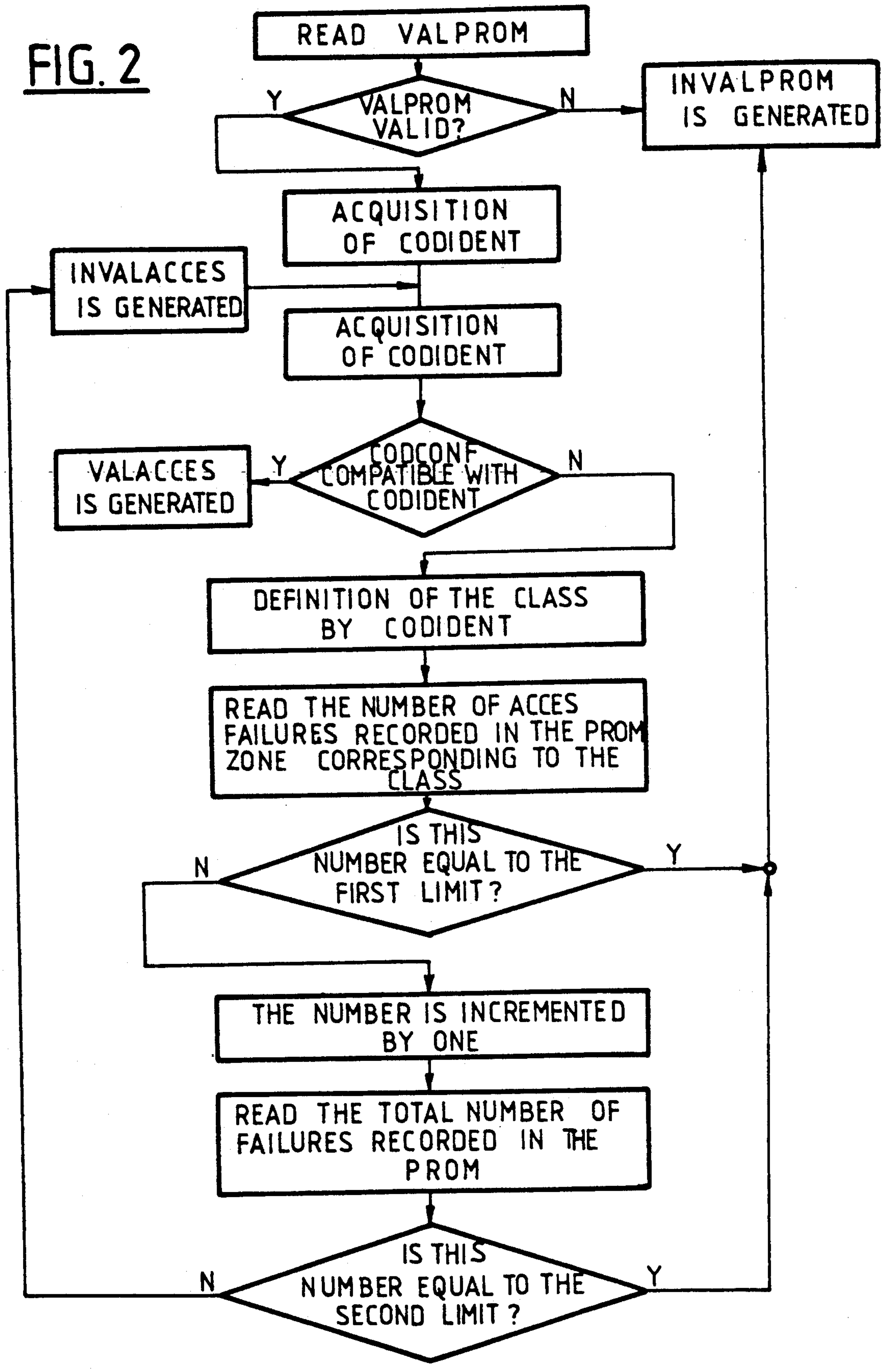
FIG. 2 is a flow chart showing the sequencing of the method of the invention.

When a magnetic card CM is inserted in the reader LCM, a set of operations is triggered, and one possible sequence is shown in the FIG. 2 flow chart.

The microprocessor mP verifies that the electronic card CE has been validated by searching for the data item VALPROM in the memory and verifying whether it is accompanied by a value representative of validity.

If invalid, the microprocessor mP applies an inhibit signal in VALPROM to the circuit ICE, thereby inhibiting operation of the point-of-sale terminal SAS.

If validated, the electronic card CE receives the identification code CODIDENT of a magnetic card CM via the reader LCM, the unit UG, and the interface ICE. This code is generally constituted merely by a serial number.

In parallel, the electronic card CE receives the confidential code CODCONF keyed in by the user of the card CM on the console CS, and transmitted via the interface ICS, the unit UG and the interface ICE.

Preferably, each digit of the code CODCONF is itself encoded in the console CS and decoded by the microprocessor mP so as to prevent any possible fraudulent interception of the confidential code CODCONF, for example by tapping the line connecting the console CS to the interface circuit ICS.

Once the microprocessor mP has the identification code CODIDENT and the confidential code CODCONF, it verifies the validity of the confidential code by verifying in conventional manner that the compatibility conditions which ought to exist between CODIDENT and CODCONF, are in fact, satisfied.

If this is the case, the microprocessor mP emits an instruction VALACCES authorizing access to the SAS, i.e., authorizing payment by means of the card CM if the SAS is a point-of-sale terminal.

If CODCONF is invalid, then an operating procedure implementing the invention is engaged.

In this case, the method of the invention no longer treats the magnetic card CM as an access means which is uniquely defined by its identification code CODIDENT, but instead treats it as an undifferentiated element in a class corresponding to a zone in the PROM.

To do this, on the basis of a PROM which is virtually or physically split into a plurality of memory zones accessible at different addresses, the method consists in assigning any card CM whose code CODCONF is invalid to one of the classes of a set of classes where the number of such classes is not greater than the number of zones in the memory.

For example, the PROM area usable for implementing the invention may comprise 4 Kbytes, and may be considered as being constituted by 1,000 zones each containing 32 bits, (leaving 24 32-bit words free for other purposes).

The class of each magnetic card is determined by the last three digits of its CODIDENT, i.e., by the three least significant digits thereof.

Since there are numerous cards having respective identification numbers CODIDENT having the same last three digits, the operation on the code CODIDENT which serves to classify the card CM having said code in this way is said to be "many-to-one". Further, since each of the last three digits of the code CODIDENT may lie in the range of 0 to 9, this transformation defines 1,000 classes, i.e., as many classes as there are zones in the PROM.

Finally, since each of the values 0 to 9 of each of the three last digits of CODIDENT are equiprobable, a magnetic card CM taken at random has a uniform probability equal to 0.001 of belonging to any one of the classes.

Once the class of the card CM has been defined, the microprocessor mP reads the number recorded in the zone of the PROM corresponding to said class.

For example, if the identification code CODIDENT is 6244962357, then its class is 357, and the microprocessor reads the contents of the PROM zone at address 357, in other words it reads the contents of the 357-th zone of the PROM.

If the number read from said zone 357 is equal to a first limit number corresponding to 32 "1" bits in the present example, then the microprocessor mP generates an INVALPROM instruction, thereby inhibiting operation of the point-of-sale terminal SAS. In this case, the trader possessing said point-of-sale terminal can return it to normal operation only after receiving authorization to use a new electronic card CE by means of a signal VALPROM transmitted over the telephone network, as described above.

If the number read from PROM zone 357 is not equal to said 32 bit limit, then the number is incremented by one, i.e., the first bit in the series of 32 bits belonging to said zone which is currently at the value "0" is changed to "1".

This operation corresponds to recording the failure to obtain access to the point-of-sale terminal SAS by the magnetic card CM in the PROM, or to recording a failure to obtain access using any other card CM belonging to the same class.

Thereafter, the microprocessor mP reads all of the bits recorded in the PROM, each of which corresponds to an access failure, and it compares the total to a second predetermined limit number, e.g., 96.

If the total equals the second limit, then the microprocessor mP generates an INVALPROM signal.

Otherwise, the microprocessor generates an INVALACCES signal. This signal informs the trader and the card holder that the confidential code is invalid and temporarily refuses payment by means of the card but nevertheless authorizes a new attempt at entering the confidential code.

Calculation shows that in the absence of a test comparing the total number of failures recorded in the PROM with a second limit number, and using the above-mentioned numerical values (a 4 Kbyte PROM split in 1,000 32-bit zones), the probability of an electronic card CE expiring after 12,000 failures is only 1%; and is about 50% for 16,800 failures.

Since the users of magnetic cards statistically get their confidential code wrong one time in ten, that means that a single electronic card CE has a 99% chance of processing 120,000 magnetic card payment operations, in the absence of fraud.

By implementing the invention, and still using the same numerical examples as above, the probability of a person who does not know the confidential code CODCONF of a magnetic card discovering it by performing successive tests on a cash register SAS equipped with a new electronic card CE (which would allow only 32 trials out of the 10,000 possibilities) is equal to only 0.32%.

In contrast, if the same person has N cards, and if the total number of failures recorded in the PROM is not monitored, then the probability increases considerably with N, since it becomes equal to $1-(1-0.0032)^N$. By comparing the total number of failures with a second limit number, this further type of fraud is made substantially more difficult.

Assigning a magnetic card CM to a class which is defined by the last three digits of its code CODIDENT, naturally constitutes a non-limiting example. This particular assignment has the advantage of giving rise to a uniform distribution of magnetic cards CM over the various classes and using the same limit number in each zone (32 in the present example). However, although these characteristics are advantageous, they are not essential.

Regardless of how each magnetic card presented is assigned to a class, the only important consideration for ensuring maximum length of life and best possible utilization of the PROM, is that the number of classes should be less than the number of magnetic cards CM and that the limit number looked out for in each zone of the PROM, i.e., the size of each such zone, should be related to the probability of a randomly selected magnetic card CM being associated with the class corresponding to said zone by a coefficient of proportionality which is the same for all of the zones.

I claim:

1. A computer implemented method of protecting a selective access system against fraudulent use of at least one access means from among a plurality of access means each having a confidential code associated therewith, the method comprising the steps of:

obtaining the result of a verification of the validity of a confidential code specified by a user of an access means on each occasion that an access means is presented to the selective access system, said result being interpreted as a success if the code is valid and as a failure otherwise;

using a memory to store a trace of failures observed for a plurality of occasions on which access means are presented to the selective access system, said failures being stored by defining a plurality of memory zones in said memory and by assigning each of the access means presented to the selective access system to a class taken from a set of classes corresponding, respectively, to said plurality of memory zones, the number of classes in said set of classes being less than the number of said access means, and by keeping a count in each of said plurality of memory zones of the number of failures associated with presented access means belonging to the class corresponding to such memory zone;

detecting when the number of failures recorded in any of the memory zones exceeds a first predetermined limit number assigned to such memory zone; and generating a signal indicative of an attempted fraud when it is detected that the number of failures in any of the memory zones exceeds said first predetermined limit number assigned to such memory zone.

2. A method according to claim 1, wherein said at least one access means are constituted by magnetic cards, each of which is associated with at least one intrinsic attribute, and wherein a class from among said set of classes is assigned to each magnetic card by applying a predetermined hashing function to the intrinsic attribute of each card.

3. A method according to claim 2, wherein said intrinsic attribute of each magnetic card is an identification number of the card, and wherein the class to which each magnetic card belongs is assigned thereto by extracting a set of at least one digit from the identification number of the card, said at least one digit being extracted as a function of the position it occupies in said identification number and said position being predetermined and selected to be closer to the less significant end of the identification number than to its more significant end, so that all of the possible values from 0 to 9 of each extracted digit are substantially equiprobable for the st of cards presented, with said first predetermined limit number then being the same for all of the memory zones.

4. A method according to claim 1, further comprising the step of providing each class with a number which defines the address of the memory zone in said memory to which it corresponds.

5. A method according to claim 1, further including the steps of detecting when the number of failures recorded in the memory zones in said memory taken as a whole exceeds a second predetermined limit number, and generating an attempted fraud signal when the number of failures recorded in the memory zones taken as a whole is detected to exceed said second predetermined limit number.

6. A method according to claim 1, wherein the step of using a memory to store a trace of failures is applied to a plurality of successive occasions on which access means are presented to the system.

7. A method according to claim 1, wherein the set of classes is selected and the plurality of access means are respectively assigned thereto such that the assignment of any access means from among said plurality of access means to any class is equiprobable, and said first predetermined limit number is the same for all of the memory zones.

8. An apparatus for protecting a selective access system against fraudulent use of at least one access means from among a plurality of access means each having a confidential code associated therewith, comprising:

verifying means for obtaining the result of a verification of the validity of a confidential code specified by a user of an access means on each occasion that an access means is presented to the selective access system, said result being interpreted as a success if the code is valid and as a failure otherwise;

memory means for storing a trace of failures observed for a plurality of occasions on which access means are presented to the selective access system, said failures being stored in a plurality of memory zones defined in said memory and with each of the access means presented to the selective access system being assigned to a class taken from a set of classes corresponding, respectively, to said plurality of memory zones, the number of classes in each set of classes being less than the number of said access means;

means for keeping a count in each of said plurality of memory zones of the number of failures associated with presented access means belonging to the class corresponding to such memory zone;

means for detecting when the number of failures recorded in any of the memory zones exceeds a first predetermined limit number assigned to such memory zone;

means for generating a signal indicative of an attempted fraud when it is detected that the number of failures in any of the memory zones exceeds said first predetermined limit number assigned to such memory zone.

9. A device according to claim 8, wherein the memory means is a programmable read only memory.

10. A device according to claim 8, wherein said memory means comprises a PROM disposed in an electronic or "smart" card which is removable from said verifying means.

11. A device according to claim 8, wherein said verifying means include a microprocessor disposed in said electronic card.

* * * * *